3 Sheets—Sheet 1.

W. B. LAWRENCE.

PRINTING PRESS.

No. 11,434. Reissued Aug. 7, 1894.

WITNESSES

Joseph W. Stack.

A. B. Morgan.

INVENTOR

William B. Lawrence, by Finckel & Finckel

Attorneys

THE NORRIS PETERS CO., PHOTO-LITHO., WASHINGTON, D. C.

3 Sheets—Sheet 2.

W. B. LAWRENCE.

PRINTING PRESS.

No. 11,434. Reissued Aug. 7, 1894.

WITNESSES

Joseph C. Stack.

A. B. Morgan.

INVENTOR

William B. Lawrence, by Finckel & Finckel,

Attorneys.

THE NORRIS PETERS CO., PHOTO-LITHO., WASHINGTON, D. C.

3 Sheets—Sheet 3.

W. B. LAWRENCE.

PRINTING PRESS.

No. 11,434. Reissued Aug. 7, 1894.

WITNESSES

Joseph C. Stack.

A. B. Morgan.

INVENTOR

William B. Lawrence, by Dickel & Dickel,

Attorneys.

THE NORRIS PETERS CO., PHOTO-LITHO., WASHINGTON, D. C.

UNITED STATES PATENT OFFICE.

WILLIAM B. LAWRENCE, OF COLUMBUS, OHIO, ASSIGNOR, BY MESNE ASSIGNMENTS, TO THE LAWRENCE PRESS COMPANY, OF OHIO.

PRINTING-PRESS.

SPECIFICATION forming part of Reissued Letters Patent No. 11,434, dated August 7, 1894.

Original No. 475,327, dated May 24, 1892. Application for reissue filed May 10, 1894. Serial No. 510,325. Patented in England December 19, 1891, No. 19,938, and in Canada August 26, 1892, No. 40,079.

*To all whom it may concern:*

Be it known that I, WILLIAM B. LAWRENCE, a citizen of the United States, residing at Columbus, in the county of Franklin and State of Ohio, have invented a certain new and useful Improvement in Printing-Presses, of which the following is a specification; and the same is patented in England December 19, 1891, No. 19,938, and in Canada, August 26, 1892, No. 40,079.

My invention relates to the improvement of printing-presses, and has particular relation to the improvement of mechanism shown in my former patent, No. 447,491, dated March 3, 1891, reissued July 18, 1893 as No. 11,352.

The objects of my invention are to simplify the construction of certain portions of the above mentioned device, which will be hereinafter specified: to provide effective inking-disks and superior means for supporting and operating the same; and to provide superior operating connection between the parts of my device. These objects I accomplish in the manner illustrated in the accompanying drawings, in which—

Figure 1:
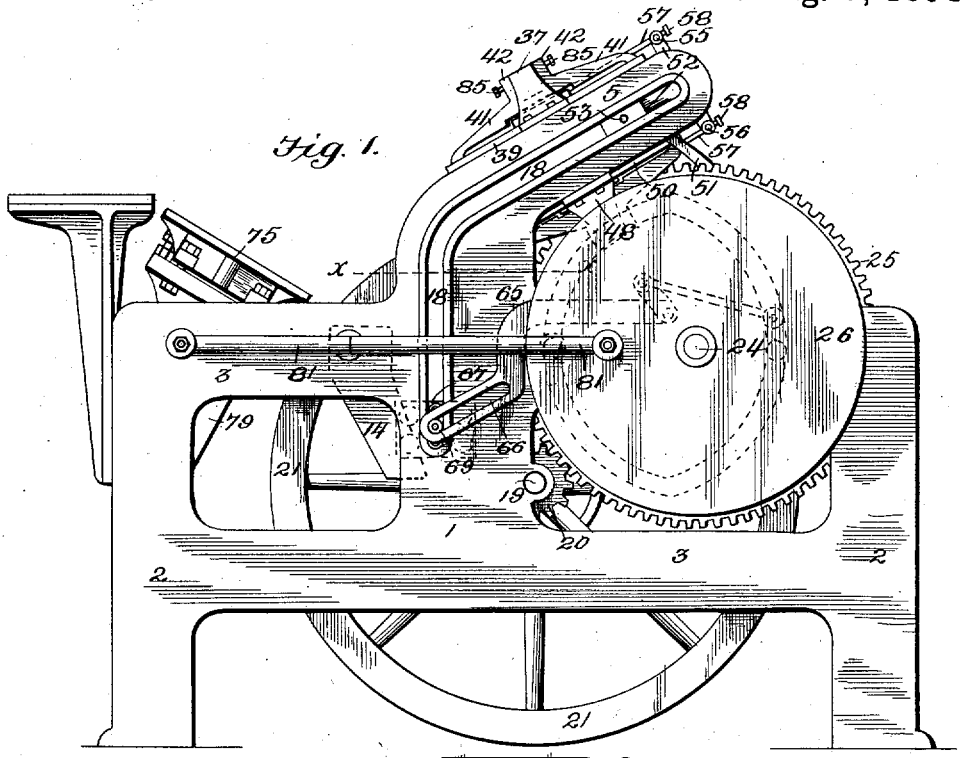
Figure 2:
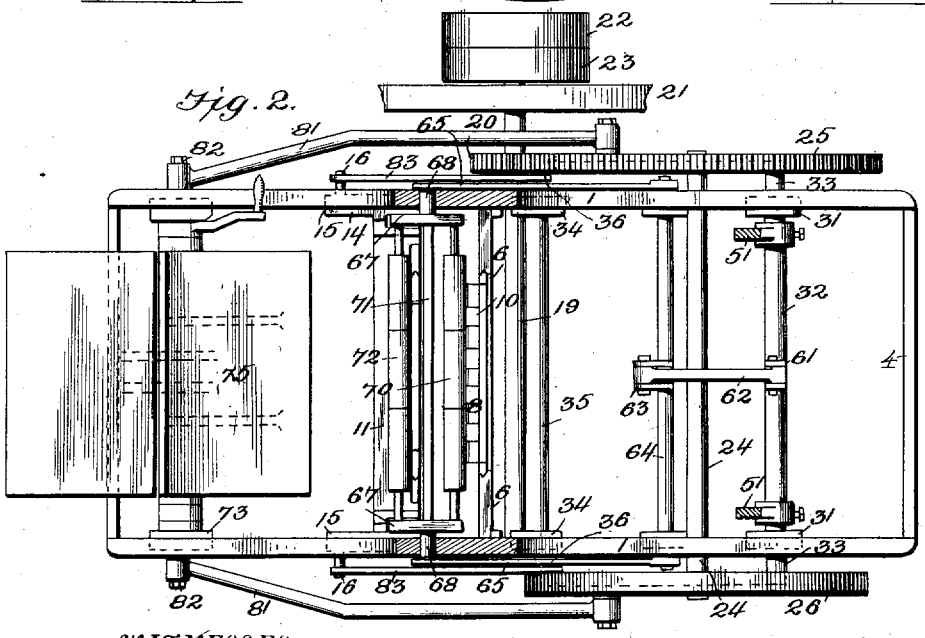
Figure 3:
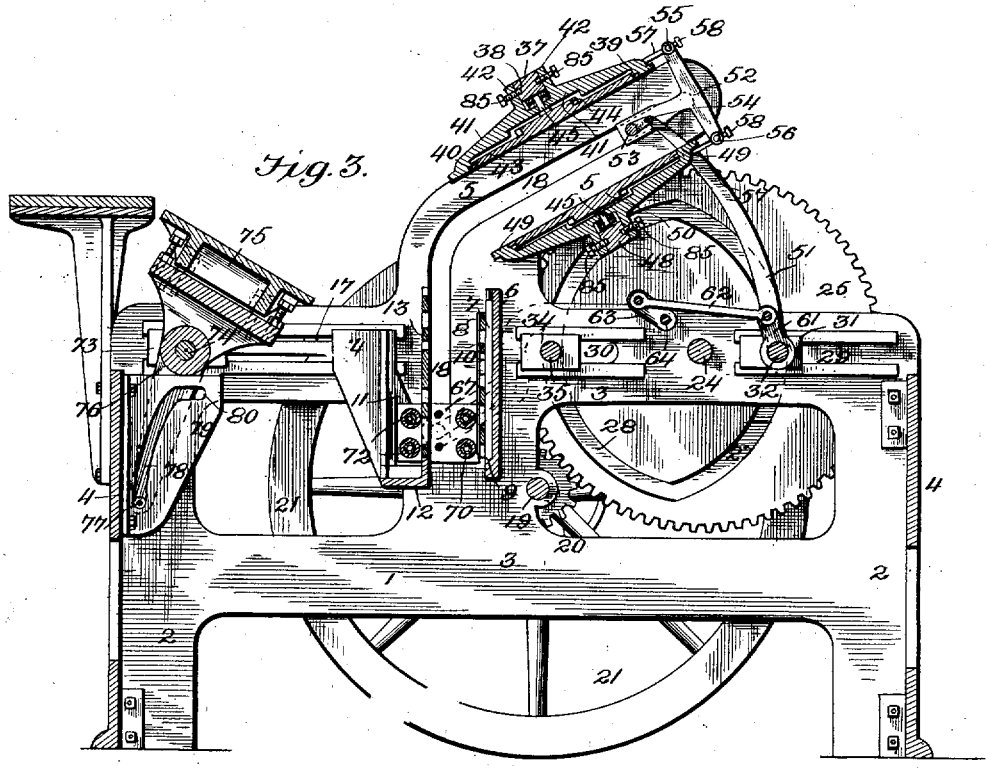
Figure 4:
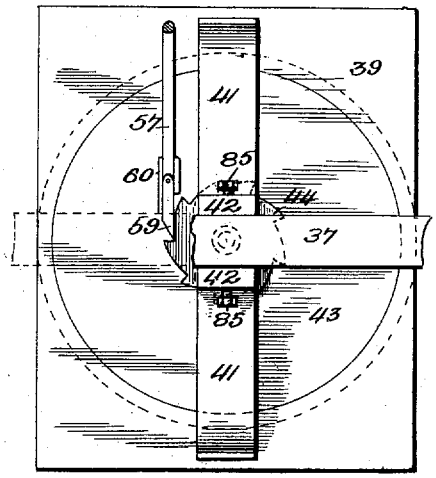
Figure 5:
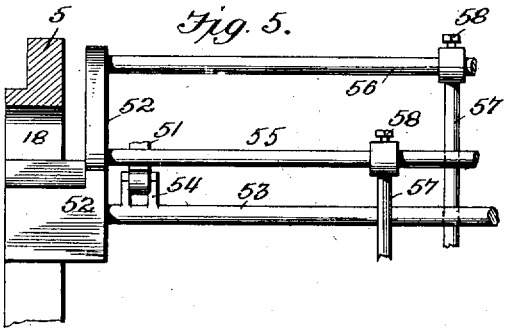
Figure 6:
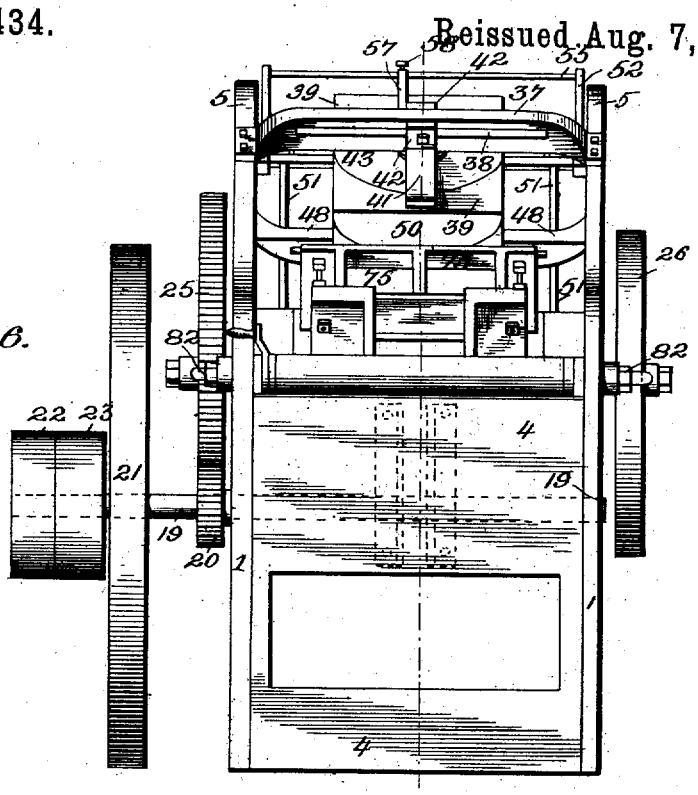
Figure 7:
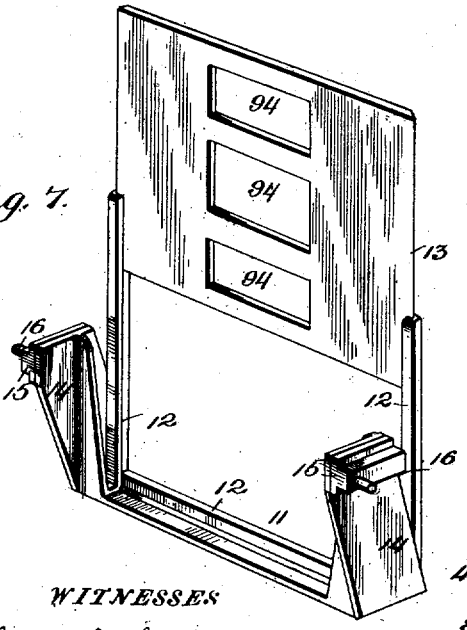
Figure 8:
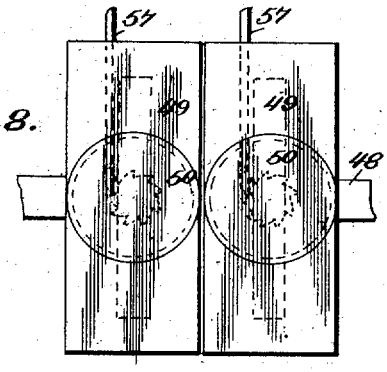
Figure 9:
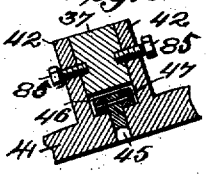

Figure 1 is a side elevation of my improved press. Fig. 2 is a plan view of the same, showing a portion of the frame broken away to line *x—x* of Fig. 1. Fig. 3 is a central longitudinal section of the press. Fig. 4 is an under side view of one of my ink-distributing plates. Fig. 5 is an enlarged plan view in detail of the distributing-plate finger-supporting rods. Fig. 6 is a front end view of my improved press. Fig. 7 is a detail view in perspective of the skeleton bed, showing a form plate partially inserted therein. Fig. 8 is a plan view in detail of two-inking-plates shown supported on one arm, and Fig. 9 is a detail sectional view showing the manner of pivoting one of the inking-disks.

Similar figures refer to similar parts throughout the several views.

1 represents the frame of my printing-press, which, as shown, is of the general oblong form, and which consists of four standards 2, which are connected in the usual manner by the frame side pieces 3 and end pieces 4. As shown in the drawings, the sides of the frame are provided at opposite points, which are approximately at the center of the length of the frame, with upwardly-extending and rearwardly-inclined frame-arms 5. Extending transversely between the sides of the frame-pieces and rigidly connected therewith is a stationary and vertical bed-plate 6, the upper end of this bed-plate being opposite the bases of the arms 5. The front face of the bed-plate 6 is provided with a depression 7, which receives, as shown, a form-plate 8, the rear portion of the latter being provided on its under side with a suitable projecting tongue, which enters and rests within a correspondingly-shaped notch in the bottom of the bed-plate, as indicated at 9. This form-plate 8, is, as shown, in the drawings, provided with desired projecting printing-faces 10.

11 represents the skeleton or traveling bed-plate, which consists, as shown, of a vertical chase-frame 12, the upper end of which is open and the side arms of which are provided on their inner surfaces with suitable vertical grooves, which are adapted to receive the correspondingly-shaped edges of the skeleton form-plate 13, which is provided with openings as indicated at 94, corresponding in size and position with and adapted to receive the printing projections 10 of the form 8.

The upper portion of the skeleton bed-plate is provided, as shown, with a flanged or enlarged base, which is of slightly greater length than the base proper of the chase-frame, and from the projecting ends of which extend upwardly side arms or plates 14 of about one half of the height of the vertical chase-frame. The upper ends of the side arms 14 of the skeleton beds have secured upon their outer sides, or formed integral therewith, projecting bearing-blocks 15, which are preferably of the tongue-form shown and from each of which projects near the forward end thereof a pin 16. The skeleton bed thus formed is movably supported between the side walls of the press-frame by having its bearing-blocks 15 projecting and sliding within oppositely-located horizontal slots 17, which are formed in the upper portion of the frame-sides 3, in front of the frame arms 5. In this manner the form plate 13 is supported in front of and opposite the form 8.

Formed in the center of the width of each of the frame-arms 5, and extending nearly to the outer ends thereof, is a slotted opening or guideway 18, which, extending to the base of the frame, is continued vertically downward in front of the stationary bed 6 to a point about the center of the height of the press-frame as shown.

19 represents the main shaft of the press, which extends transversely through and is journaled in the frame sides at a point in the rear of the lower end of the stationary bed-plate 6. One end of the shaft 19 projects, as shown, without one side of the machine, which for distinction I will term the "gear side." This outwardly-projecting shaft portion carries, as shown at 20, and near the press-frame a pinion-wheel. On the outer side of said pinion-wheel, at a distance therefrom, the shaft 19 carries a fly-wheel 21, and without said fly-wheel loose and tight belt-wheels 22 23.

24 represents a transverse shaft, which passes through and is journaled within the sides of the frame in the upper and rear half thereof, said shaft being in horizontal alignment with the center of the slot 17. This shaft 24 carries on the gear side of the machine a gear-wheel 25 and on the opposite side thereof a cam-disk 26. As described in my said former patent for the "cam-disk *f*," both the gear wheel 25 and cam-disk 26 are provided on their inner faces with a continuous camway or groove formed by the connection of concentric and eccentric grooves 27 and 28.

The upper portions of the side frames 3 are provided, as shown, near their rear ends and opposite the rear half of the gear-wheel and cam-disk with oppositely-located longitudinal guideways 29, while similar slotted guideways are formed in said upper frame portions in line with and in front of the slots 29 and opposite the forward half of the gear and cam-wheels.

31 represents cross-heads or blocks, which fit and slide, as shown in my said former patent, in the rear frame-guideways 29. These cross-heads 31 are connected by a transverse shaft or rod 32, which is rigidly connected therewith. Projecting outwardly from the outer sides of the cross-heads 31 are pins or idlers 33, which project loosely within the camways of the gear-wheel and disk. Fitting and sliding within the frame-guideways 30 are cross-heads 34, the inner sides of which are connected by a transverse shaft or rod 35. The outer sides of the cross-heads 34 have projecting therefrom idlers or pins 36, which extend within the camways of the gear-wheel and cam-disk at points horizontally opposite the idlers 33. These pins 36 are connected on the outer side of the frame with the projecting pins 16 of the bearing-blocks or heads of the traveling bed-plates by arms 83.

Bridging the upper sides of the frame-arms 5 is a distributing-disk-supporting arm 37, the body of said arm being rectangular in cross section and said body having formed in its opposite sides longitudinal grooves or keyways 38.

39 represents a flat inking-plate, which may be square or oblong and which is provided with a central disk-opening, about the upper end of which projects inwardly a flange or shoulder 40. The upper side of this inking-plate has formed therewith a raised rib or arm 41, which bridges the disk-opening in said plate diametrically, as shown. Formed with the center of the rib 41 are two upwardly-extending lugs 42 which, as shown, are adapted to embrace, loosely, opposite sides of the inking-disk arm 37. These lugs 42 have passing therethrough set-screws 85, the inner ends of which engage with the keyways 38, and which may be tightened against the inner surface of said key-ways to produce a rigid connection of the arms 41 and 37.

43 represents an inking-disk, which, as shown, fits loosely in the circular opening in the plate 39 and which bears against the shoulder 40 of the latter. As shown in the drawings, the under surface of this disk is flush with the lower face of the plate 39, within which it turns. The upper and central portion of the inking-disk has formed thereon a small ratchet-wheel 44, which extends within a depression on the under side of the central portion of the rib or arm 41. The inking-disk is provided with the usual central stem 45, which extends upwardly from the center of the ratchet 44 and which, passing and projecting through an opening formed in the center of the arm 41, is provided with a flanged head consisting of a collar 46, which is connected with the upper end of the stem 45 by a transverse pin 47. In this manner the inking-disk is suspended in a rotating position within the plate, 39.

Extending between the under sides of the frame-arms 5 is a disk-supporting arm 48, which corresponds with the arm 37. As prescribed for said upper arm, this lower arm 48 is connected with an inverted plate 49, corresponding with the upper plate 39, and, as prescribed for the upper disk 44 and lower disk 50, is supported in a rotating position in said lower plate. It will thus be seen that the upper and lower inking-disks are made to face each other on opposite sides of the frame-arms 5.

Rigidly connected with each end of the shaft 32 on the inner side of the cross-head 31 is the lower end of an upwardly-extending and forwardly-curved arm 51.

52 52 represent approximately T-shaped cross-heads or sliding pieces, the stems of which bear and slide within the upper portions of the frame-arm slots 18. These stems of the cross-heads 52 are connected by a transverse rod 53, from which project outwardly near each end thereof rigid lugs 54, to the outer ends of which are pivotally connected the upper ends of the arms 51. The ends of the outer top pieces or heads of the T-shaped cross-heads 52 are connected by parallel rods 55 56, on each of which is mounted the enlarged end of a pawl or finger 57, the enlarged heads of said pawls being pierced to receive loosely the rods 55 56 and being adjustably connected therewith by set-screws 58, which pass through said pawl-heads and engage with the peripheries of the rods. The forward end of each of these pawls or fingers has jointedly connected therewith a pawl-head or extension 59, which, as shown in drawings, engages with the teeth of the ratchet 44 of the upper or lower inking-disk, as shown in Fig. 4 of the drawings. This pawl is held in spring-contact with the teeth of the ratchet by a spring-strip 60, which covers the joint of the pawl-finger and its head on the outer sides thereof. Extending upwardly from the center of the length of the rod or shaft 32 is a short rigid arm 61, the outer end of which arm is pivoted to the rear end of a forwardly-extending rod 62, which has its forward end pivotally connected with the outer end of a short arm 63, the inner end of which is fixed upon a shaft or rod 64, which extends transversely between the upper portions of the frame sides. As shown in the drawings, the shaft 64 has its ends journaled in the frame sides and projecting therethrough. To each of the outer projecting ends of the shaft 64 is journaled the inner end of an ink-roller-driving arm 65. Each of these arms 65 extends forwardly in close proximity to the outer side of the press-frame and is provided at about the center of its length with an angular bend, as indicated in the drawings. The forward end portions of the arms 65 are provided with longitudinal slots 66, which have their termination opposite the slot 18 of the frame.

67 represents roller-bearing blocks, which are supported, respectively, in positions adjacent to the inner sides of the frame sides opposite the slots 18, said blocks having outwardly-projecting pins 68, which pass through said slotted openings 18 and carry upon their outer ends frictional-rollers 69. These rollers 69 bear and travel within the slots 66 of the arm 65. As shown in the drawings, ink-rollers 70, arranged one above the other, have their shaft or spindle ends journaled in the inner faces of the blocks 67 near the rear end of the latter, while rollers 72 are similarly journaled between the forward end portions of said blocks. The blocks 67 are further connected by transverse rods 71. Fitting and sliding within the forward portions of the frame slot or guideway 17 are oppositely-located cross-heads 73, between which extends a platen-shaft 74. Upon this platen-shaft is journaled the base or lower portion of the body of a platen 75. Formed with the platen and extending downwardly from its journal is a central arm 76, which is rigidly connected at its lower end with the center of the length of a transverse rod 77, the ends of which are journaled in oppositely-located upwardly and forwardly curved slots 78, formed in the frame-plates 79, which are secured to the inner side of the forward end of the press-frame and extend inwardly on opposite sides of said platen-arm. The upper ends of the plate-slots 78 extend horizontally forward a short distance to form the shoulders or offsets 80.

81 represents horizontal drive-arms, the rear ends of which are pivoted eccentrically to the outer faces of the disk 26 and gear-wheel 25. The forward ends of the drive-arms are pivotally connected with the outwardly-projecting pins 82, which extend outwardly through the frame side from the platen-shaft cross-heads.

In using my press for printing more than one color, the desired skeleton form is supported in the chase of the skeleton bed-plate, as described, and the form 8, having the desired printing projections thereon, which coincide with the openings in the skeleton form, is rigidly supported in the stationary bed-plate, the lower inking-disk 43 and plate 39 are provided with one color of ink and the upper disk and plate provided with ink of a different color. The roller-bearing blocks being in such position as to cause the rear inking-rollers to bear against the lower portion of the form 8 and the forward rollers bearing against the lower portion of the form 13, the gear-wheel and cam-disk being so turned that the pins 33 project within the centers of the portions 27 of the cam-ways, the pins 36 projecting within the centers of the portions 28 of the cam-ways, and the platen-arm rod 77 being in the lower end of the slots 78 of the plates 79, all as shown in the drawings.

The operation of my device is as follows: Motion is communicated through a suitable belt to the belt-wheel 23, its shaft 19, and pinion 20. Through engagement of the pinion and gear-wheel 25 motion is transmitted to the shaft 24, which transmits a corresponding motion to the cam-disk 26 on the opposite side of the frame. This rotation of the cam-disk and gear-wheel will bring the cross-head pins 33 into frictional contact with the shoulders of the eccentric grooves 27, and operate thereby to drive the cross-heads 31 rearward in their guideways 29. This rearward movement of the cross-heads 31 and shaft 32, will, through the arm 61 cause the partial rotation rearward of the shaft 64. Through this movement of the shaft 64 an upward movement is transmitted through the consequent elevation of the arms 65 to the roller-bearing blocks 67, and the pins 68 of the latter traveling within and following the slots 18 of the frame. The rollers having thus been carried to the upper portion of the press, it will be seen that the rear pair of rollers will be made to travel upon the plate 49 and the disk 50, while the forward pair of rollers will travel against the under side of the upper inking-disk 43 and plate 39. The hereinbefore-described movement of the shaft 32 will also result in a rearward movement of the cross-heads 52 and a consequent corresponding movement of the ratchet-operating finger 57, the spring-actuated head of said finger or pawl being thus drawn back to engage with a notch of the ratchet-wheel. When the inking-rollers are thus driven to the upper end of the frame, the gear-wheel and cam-disk will turn sufficiently to bring the cross-head pins 33 into the portion 28 of the camway, where, because said portion is concentric, as described, said pins will remain for a time idle. The above-described movements of the gear-wheel and cam-disk will, as the rollers are being driven upwardly, as described, cause, through the drive-arms 81, a forward movement of the cross-heads 73 and a consequent forward movement of the platen 75 and upward and forward movement of the platen-arm rod 77. As the cross-head pins 33 enter the portions 28 of the camway the pins 36 enter the eccentric portion 27 of said camway, which will result through the contact of said pins 36 and the shoulder of the camway portion 27 in a rear sliding movement of the cross-heads 34. This movement of the cross-heads 34 will result, through the connection therewith of the pins 36 and traveling skeleton bed-plate pins 16, in a rearward movement of said traveling bed-plate, and the movement of the latter will operate to drive the skeleton form 13 against the form 8, allowing the printing-faces of the latter to enter the mortises of the former and bring the front faces of said printing projections flush with the front face of said skeleton form. While the inking-rollers are at rest at the top of the press, the rearward motion of the platen is continued until it presses the paper supported thereon and to be printed upon firmly against the faces of the forms to produce the impressions. It will be observed that at this time the ends of the platen-arm rod 77 are supported in the short horizontal portions 80 of the slots 78, which will insure a direct forward and rearward movement of the platen. A partial revolution of the gear-wheels having been completed, the arms 81 will force the platen back to its former position, the shaft pins or idlers 33 36 will shift into different positions of the camway, and the cross-heads 31 34 will successively return to the first-described position. This movement will result in the forward movement of the traveling bed-plate and its skeleton-form and the downward movement of the rollers to the position first described. The upper and lower disks containing different colors of ink, it will be seen that the movement of the rollers over the two forms will result in supplying them with ink of different colors. If desired, it is obvious that by my construction each of the arms of the inking-disk-supporting arms 37 and 48 may be provided with two or more inking-disks and plates corresponding with those herein shown, and each of the said inking disks and plates may be provided with a separate color of ink, thus imparting to each set of rollers different colors of ink, and resulting in imparting to the printing-faces a number of different colors.

It is observed that the forward movement of the cross-heads 31 will cause a forward sliding movement of the cross-heads 52, which in turn will result through the fingers of the pawls 57 and their engagement with the ratchet-wheels of the inking-disks, in a partial rotation of the latter.

In using my improved press for printing in one color it is obvious that the skeleton form may be removed from the traveling bed-plate, and only the lower inking-disk and plate employed. From the construction shown and described it will readily be seen that the slotted plates 79 will afford a support for the platen, which will result in the latter being carried in the desired direction during its movement.

Having now fully described my invention, what I claim, and desire to secure by Letters Patent, is—

1. In an inking device for printing presses, the combination of arms 5 5, an arm or bar 37 bridging arms 5 5, a plate 39 having an opening, an arm or bar 41 on said plate bridging the opening and provided with a lug or lugs 42 to engage bar 37, and an ink-disk 43 suspended from arm 41 and rotatable within the said opening, substantially as described.

2. In an inking device for printing presses, the combination of arms 5 5, an arm or bar 37 bridging arms 5 5 and having a key-way 38, a plate 39 having an opening, an arm or bar 41 on said plate bridging the opening and having a lug or lugs 42 to engage the bar 37, a set-screw 85 passing through the lug or lugs and into the key-way, and an ink-disk 43 suspended from bar 41 and rotatable within the said opening, substantially as described.

3. In an inking device for printing presses, the combination of arms 5 5, an arm or bar 37 bridging arms 5 5, a plate 39 having an opening, an arm or bar 41 on said plate bridging the opening and provided with a lug or lugs 42 to engage bar 37, an ink-disk 43 suspended from bar 41 and rotatable within said opening, a ratchet-wheel 44 on said ink-disk, a reciprocating pawl carrier 52, and a pawl 57 to engage the ratchet-wheel, substantially as described.

4. In an inking device for printing presses, the combination of arms 5 5 having a guide-way 18, arms or bars 37 bridging arms 5 5 on opposite sides of the guide-way and each having thereon plate 39 formed with an opening, an arm or bar 41 on said plate bridging the opening and provided with a lug or lugs 42 to engage the bars 37, an ink-disk 43 suspended from bar 41 and rotatable within the aforesaid opening, and a ratchet-wheel on the ink-disk, the cross-head or T-shaped bodies 52 movable in guide-way 18 and pawls 57 58 thereon to engage both the ratchet-wheels, substantially as described.

5. In a printing press, the combination of the main frame 1 having slots 29 30, frame-arms 5 5, the said frame and arms having a guide-way 18, a rotatable ink-disk supported on said arms, roller-bearing blocks moving in said guide-way, means for rotating the ink-disk, the gear-wheel 25 and disk 26 having cam-ways therein formed of concentric groove 28 and eccentric groove 27, cross-heads 31 and 34 sliding in the slots 29 30 having studs or pins engaging the aforesaid cam-ways and connected by shafts 32 and 35, arms 51 extending from shaft 32 and connected with and operating the means for rotating the ink-disk, arm 61 on said shaft 32, shaft 64 having arm 63, rod 62 connecting arms 61 63, and slotted arms 65 for moving the roller-bearing blocks connected with shaft 64, all substantially as described.

6. In a printing-press, the combination with the main frame 1 provided with slots 29 30, the parallel frame-arms 5 having slots 18 as described, fixed vertical bed-plate 6 between said frame's sides, the movable printing-plate, connected roller-bearing blocks 67 opposite said slot 18 having pins or studs 68 working in said slots, inking-rollers journaled between said roller-bearing blocks, an inking plate or disk for each set of rollers and a ratchet-wheel secured thereto, of the rotating gear-wheel 25 and disk 26, having camways therein, formed, as described, of concentric and eccentric grooves 27 28, cross-heads 34 31, sliding in slots 29 and 30, having pins or studs engaging the cam-ways, and connected by shafts 35 32, arms 83 connecting cross head 34 with the movable printing plate arms 51 extending from shaft 32, cross-heads or T-shaped bodies 52 jointedly connected with arms 51 and sliding in frame-grooves 18, rods 55 56, connecting the outer arms of bodies 52, pawls or fingers supported from said rods and engaging with the teeth of the inking-disk ratchet-wheel, arm 61 projecting from shaft 32, shaft 64 and arm 63 projecting therefrom, rod 62 connecting said arms 61 63, and slotted arms 65 connecting, as described, the shaft 64 and roller-bearing block-pins 68, substantially as described.

WILLIAM B. LAWRENCE.

Witnesses:
GEORGE M. FINCKEL,
FRANK M. RAYMUND.